June 30, 1964 K. G. BURKITT 3,139,275
INDEPENDENT SUSPENSION
Filed Aug. 17, 1961
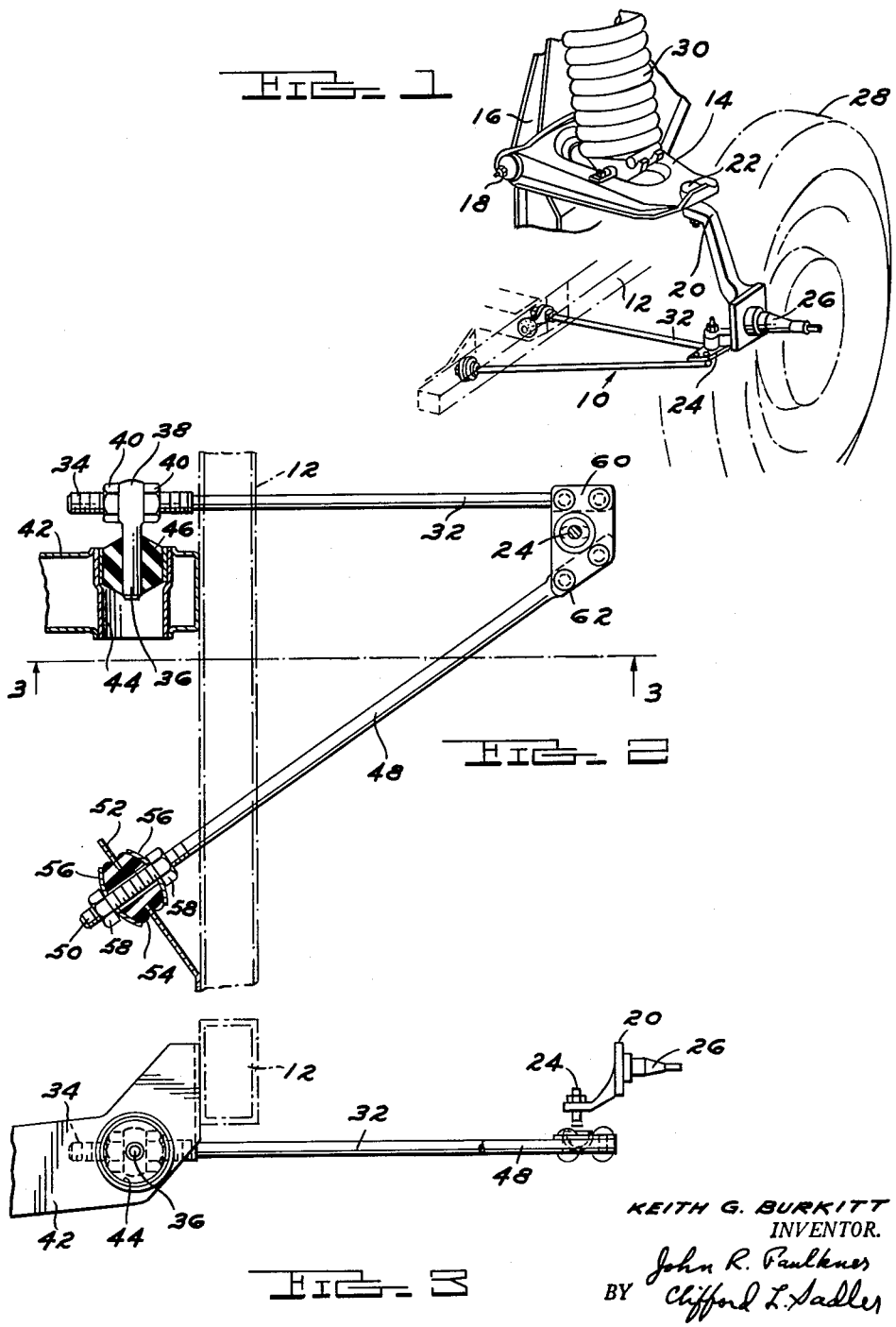
KEITH G. BURKITT
INVENTOR.
BY John R. Faulkner
Clifford L. Sadler
ATTORNEYS

United States Patent Office 3,139,275
Patented June 30, 1964

3,139,275
INDEPENDENT SUSPENSION
Keith G. Burkitt, Dearborn, Mich., assignor to Ford Motor Company, Dearborn, Mich., a corporation of Delaware
Filed Aug. 17, 1961, Ser. No. 132,111
5 Claims. (Cl. 267—20)

This invention relates to vehicle suspension systems, and more particularly, to an improved suspension arm for such a system.

It is an object of the present invention to provide an independent suspension system for a motor vehicle which is characterized by its simplicity of construction and economy of manufacture.

More specifically, it is an object of the present invention to provide a unique suspension arm construction of composite design. The suspension arm has a main portion and a drag strut portion which are formed of cold forged steel bar stock. The inner ends of both portions are pivotally mounted on body support structure by rubber bushings. The outer ends of the bar are bolted or riveted to a metal stamping that is provided to carry a spindle mounted ball joint.

The connection of the main portion of the arm with the body support structure employs a pair of threaded members which are easily accessible to adjust the camber of the wheel. Caster angle is equally easy to adjust.

These and other objects of the present invention will be more fully comprehended from the following discussion and the accompanying drawings, in which:

FIGURE 1 is a perspective view of a vehicle independent suspension incorporating an embodiment of the present invention;

FIGURE 2 is a top plan view of the lower support arm construction of the suspension of FIGURE 1; and FIGURE 3 is an elevational view taken along section lines 3—3 of FIGURE 2.

Referring now to the drawings and the following detailed description for a better understanding of this invention, FIGURE 1 discloses an independent suspension system for a motor vehicle incorporating the presently preferred form of this invention.

In FIGURE 1 a lower support arm 10 of composite construction is pivotally connected to a longitudinal vehicle frame member 12. An upper suspension arm 14 is connected to frame structure 16 by pivot 18. A wheel supporting spindle 20 is joined at its upper end by a ball joint 22 to the upper arm 12 and by a ball joint 24 to the outer end of the composite lower arm 10. Spindle 20 has a stub shaft portion 26 upon which a road tire and wheel combination 28 is rotatably mounted.

A suspension spring of coil type 30 is mounted upon the upper suspension arm 14 at its lower end and is seated at its upper end in body support structure. Spring 30 permits the body and other sprung components to be resiliently supported on the road wheel 28.

Referring to FIGURE 2 for the construction of the lower arm 10, a laterally extending main portion 32 is formed of cold forged steel bar and has a threaded inner end 34. A stud member 36 having one end thereof formed in an eye 38 is passed over the threaded end 34 of the main section 32. A pair of lock nuts 40 position the eye 38 of the stud 36 on the threaded end 34.

Frame member 12 has a cross-frame member 42 welded thereto. A tubular or cylindrical socket 44 is provided in the frame member 42 and an annular shaped rubber bushing 46 is fitted into it. The shaft end of the stud 36 is force fitted into the central opening of the bushing 46. With this construction the rubber 46 is highly loaded under compression to retain the stud 36. The stud 36 forms a pivot for the transversely extending member 32 having a longitudinal axis.

A drag strut 48 forms a portion of the composite arm 10. The drag strut 48 extends from a point on the frame 12 forwardly of the stud 36 in a diagonal rearward direction. Drag strut 48 is also formed by cold forging steel bar stock and has a threaded inner end 50. A bracket member 52 is welded to the frame member 12 and has an opening through which the threaded end 50 passes.

A grommet-shaped rubber member 54 is fitted into the opening in the bracket 52 and receives the threaded end 50 of the bar 48. The exposed faces of the grommet 54 are contained in a sandwich fashion between concave washers 56. A pair of lock nuts 58 are positioned outwardly of the washers 56 and are tightened to retain the threaded end 50 relative to the bracket 52. The nuts 58 may be tightened to compress the rubber to control the degree of flexibility of the connection. The nuts 58 may also be adjusted axially to control the positioning of the bar 48 relative to the frame.

As seen in FIGURE 2, the bar 32 extends transversely of the frame 12 and has a longitudinal pivot axis determined by the stud 36. The drag strut portion 48 of the composite arm 10 is connected to the frame bracket 52 forwardly of the bar end 34 and extends rearwardly therefrom. The bars 32 and 48 are joined at their outer ends by a plate 60 to which they are affixed by any appropriate means, such as rivets 62. The ball joint assembly 24 has its socket member seated on the plate 60.

It will thus be seen that adjustment of the lock nuts 40 axially on the end 34 will determine the transverse position of the bar 32. The bar 32 may thus be moved as desired to tilt the wheel 28 in or out of a perpendicular longitudinal plane. This adjustment is made to provide the desired amount of camber angle. It is usually considered that a camber angle of one-half degree outward tilt is appropriate. After a period of time, when the vehicle has been in use, it may be desirable to readjust the camber angle so as to return it to its original setting. The present invention provides a simplified means for performing such adjustment.

In conventional vehicle constructions, where the suspension arm is formed of a sheet metal stamping and is connected to a solid one-piece pivot shaft, it is necessary to do considerable disassembly of the pivot construction in order to remove or install sheet metal positioning shims. These shims are used for establishing the appropriate camber angle. It will be readily seen that adjustments of the nuts 40 on the threaded end 34 provided a much simplified construction for providing a camber angle adjustment. The nuts 58 on the threaded end 50 of the drag strut 48 can also be adjusted for wheel alignment purposes. Movement of the bar 48 will move the lower ball joint 24 in both a transverse and a longitudinal direction because the bar 48 is disposed diagonally. Therefore, the nuts 58 may be used to control the caster angle of the wheel spindle 24.

The foregoing description constitutes the presently preferred embodiment of the instant invention. It is presented for purposes of illustration and not limitation. Modifications and alterations may occur to those skilled in the art which will come within the scope and spirit of the following claims.

I claim:

1. In an independent vehicle suspension system having sprung and unsprung components, a suspension arm having a bar portion, a pivot for said portion including an annular rubber bushing mounted in said sprung components, a stud received in said bushing, means securing said portion to said stud, said means being adjustable to vary the location where said stud is secured along the length of said bar portion.

2. In an independent vehicle suspension system having sprung and unsprung components, a composite laterally extending suspension arm, said arm having fore and aft bar portions, a first pivot for said arm including an annular rubber bushing mounted in said sprung components, a stud received in said bushing, threaded means securing said aft bar portion to said stud, said threaded means being adjustable to vary the lateral position of said arm with respect to said sprung components.

3. In an independent vehicle suspension system having sprung and unsprung components, a composite lateral suspension arm interconnecting said components, said arm having first and second pivots, the first pivot of said arm including an annular rubber bushing mounted in said sprung components, a stud received in said bushing, threaded means securing said arm to said stud, said threaded means being adjustable to determine the transverse position of said arm at said first pivot, said second pivot comprising an annular rubber member mounted on said sprung components, said rubber member receiving a portion of said arm, a threaded device engaging said portion and said rubber member, said device determining the longitudinal and transverse position of said arm relative to said sprung components.

4. In an independent vehicle suspension system having sprung and unsprung components, a composite lateral suspension arm, said arm having fore and aft bar portions, a first pivot for said arm including an annular rubber bushing mounted in said sprung components, a stud received in said bushing, threaded means securing said aft bar portion to said stud, said threaded means being adjustable to determine the transverse position of said arm at said first pivot, a second pivot comprising an annular rubber member mounted on said sprung components, said rubber member receiving said fore bar portion of said arm, a threaded device engaging said fore bar portion and said rubber member, said device determining the longitudinal and transverse position of said arm relative to said sprung components.

5. In an independent vehicle suspension system having sprung and unsprung components, a suspension arm having a bar portion, a pivot for said portion including a bushing mounted in said sprung components, a stud received in said bushing, means securing said portion to said stud, said means being adjustable to vary the location where said stud is secured along the length of said bar portion.

References Cited in the file of this patent

UNITED STATES PATENTS

| | | |
|---|---|---|
| 1,998,641 | Shaw | Apr. 23, 1935 |
| 2,624,592 | MacPherson | Jan. 6, 1953 |
| 2,972,489 | Collier et al. | Feb. 21, 1961 |

FOREIGN PATENTS

| | | |
|---|---|---|
| 827,261 | Great Britain | Feb. 3, 1960 |